United States Patent [19]
Zerlauth

[11] 3,884,041
[45] May 20, 1975

[54] GAS TURBINE

[75] Inventor: Ferdinand Zerlauth, Andelfingen, Switzerland

[73] Assignee: Sulzer Brothers Ltd., Winterthur, Switzerland

[22] Filed: Nov. 6, 1973

[21] Appl. No.: 413,312

[30] Foreign Application Priority Data
Nov. 8, 1972   Switzerland...................... 16247/72

[52] U.S. Cl. .................... 60/657; 60/39.08; 60/682
[51] Int. Cl. ............................. F02g 7/06; F02g 7/28
[58] Field of Search................... 60/39.08, 682, 657; 415/113

[56] References Cited
UNITED STATES PATENTS
3,382,670   5/1968   Venable........................ 415/113 X 3,433,020   3/1969   Earle, Jr. et al. .................. 60/39.08
3,527,054   9/1970   Hemsworth..................... 60/39.08 X
3,528,241   9/1970   Venable et al................. 60/39.08 X

*Primary Examiner*—Martin P. Schwadron
*Assistant Examiner*—Allen M. Ostrager
*Attorney, Agent, or Firm*—Kenyon & Kenyon Reilly Carr & Chapin

[57]          ABSTRACT

The bearing for the shaft between the compressor and turbine is housed within a casing which is sealed off from the surrounding environment by labyrinth seals. These seals are supplied with barrier air at a pressure $p_2$ higher than that outside the casing. The barrier air is tapped from the flow path between the compressor and turbine on the exit side of the diffuser and is returned into the main gas flow between the compressor and turbine at a point where the pressure $p_1$ is lower.

4 Claims, 1 Drawing Figure

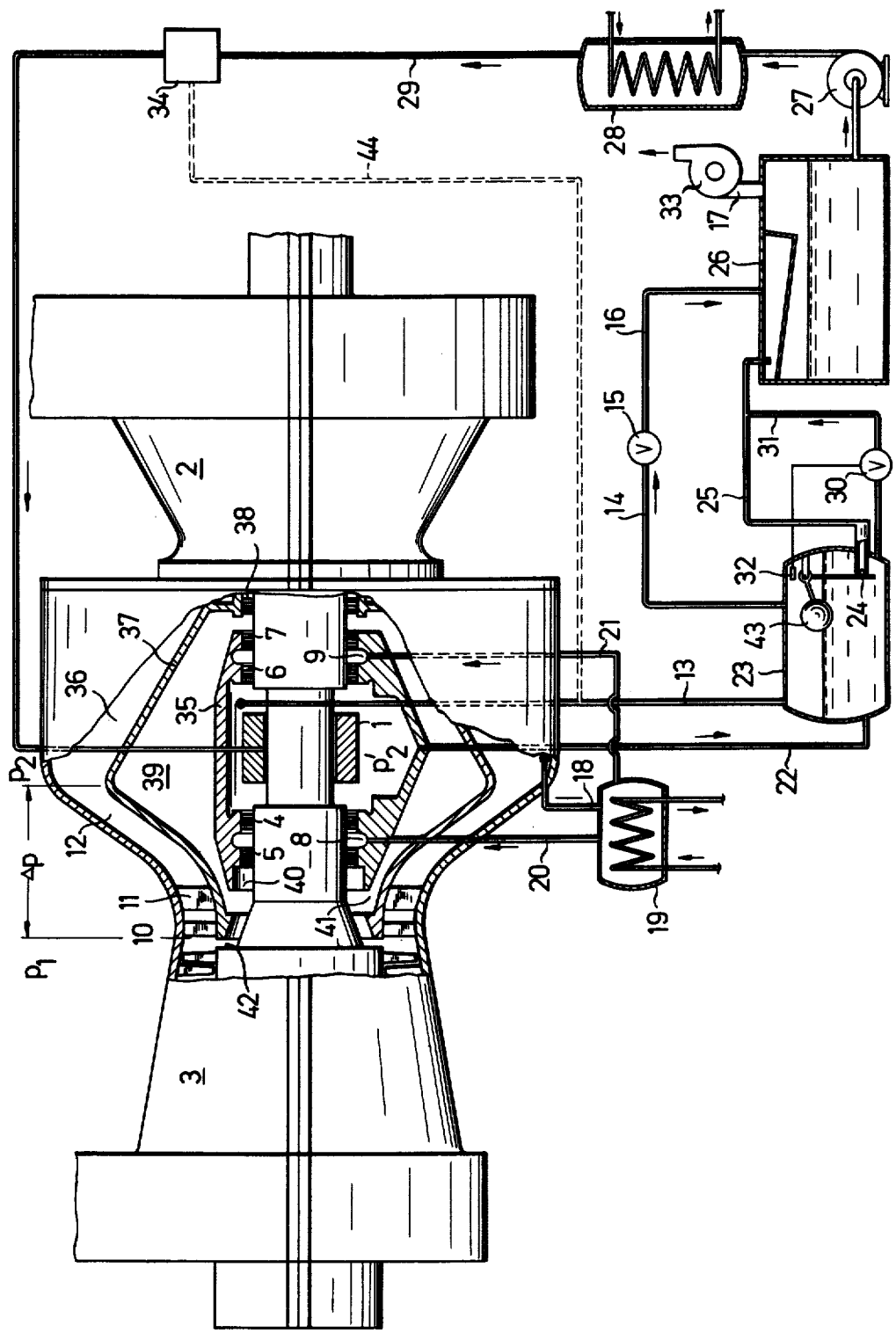

GAS TURBINE

This invention relates to a gas turbine, and particularly, to a gas turbine which utilizes a rotor bearing in line between a turbine and a compressor.

As is known, various gas turbines have been constructed for compactness with a common rotor bearing between a compressor and an adjacent turbine. However, since the bearing has been disposed in a zone of the gas turbine which is subject to an elevated pressure, the bearing has been housed in a sealed casing in order to shield the bearing from the working flow path. In addition, in order to adequately lubricate and cool the bearing, the bearing has been lubricated by a pressurized oil system. Further, in order to prevent the transfer of lubricating oil into the flow of working medium, labyrinth seals have been used at the casing ends for sealing the casing with respect to the rotor. Also, a barrier medium has been fed to the interior of these seals, for example, via annular chambers in the seals. Generally, the barrier medium is supplied at a pressure which is higher than that of the ambient zone and, therefore, higher than the pressure in the bearing casing.

However, in some instances, it has been found that the pressure gradient for the seals has been inadequate for effecting a reliable seal. Further, in some cases, the discharge of the barrier medium has not been clearly defined.

It is an object of the invention to provide an adequate pressure gradient for a barrier medium used in sealing a rotor bearing casing of a compact gas turbine.

It is another object of the invention to ensure a clearly defined discharge in the seals of a sealed rotor bearing casing of a gas turbine.

It is another object of the invention to effect a reliable sealing of a rotor bearing casing in a gas turbine between a compressor and a turbine.

Briefly, the invention is directed to a gas turbine in which a compressor and a turbine have a rotor or shaft mounted in a bearing located in the flow path between the turbine and compressor and in which a casing having contactless seals, such as labyrinth seals, is used to house the bearing. The gas turbine further has a pressurized oil system for lubricating the bearing and a diffuser at the exit end of the compressor which serves to conduct working medium and compressed air to the turbine. In accordance with the invention, compressed air is tapped out of the exit end of the diffuser via a tapping duct and is delivered to the labyrinth seals as a barrier medium at a pressure higher than that in the bearing casing as well as outside the bearing casing. In addition, means are provided to define a return flow path for the barrier medium so that the barrier medium can be returned from the labyrinth seals to the compressor. This means merges into the working medium flow path at a point in the compressor between the last rotor blade ring and the associated exit stator blade ring which follows in the flow direction. In this way, not only is the pressure rise of the actual diffuser available but also, in addition, that of the last row of stator blades is made available for the barrier air.

In some circumstances, it may be advantageous if a cooler is provided in the tapping duct for the air which flows from the diffuser to the labyrinth seals in order to cool the air before use as the barrier medium. It may also be advantageous if a lubricating oil tank of the pressurized oil system functions as a cooler for the compressed air.

These and other objects and advantages of the invention will become more apparent from the following detailed description and appended claims taken in conjunction with the accompanying drawing in which:

The drawing illustrates a schematic view of a gas turbine according to the invention including a pressurized oil system for lubrication of the rotor bearing.

Referring to the drawing, the gas turbine has a rotor which is journalled in a rotor bearing 1 and is common to a compressor 3 and a turbine 2. The bearing 1 is housed in a bearing casing 35 situated between the compressor 3 and turbine 2 and is sealed by contact-free glands or labyrinth seals 4, 5, 6, 7 in the casing 35 from the ambient zone outside the casing 35. The interior of the casing 35 is maintained at a pressure $p'_2$ by means of connecting lines 13, 14, 16, 17 and a reducing valve 15 such as a fixed orifice diaphragm as explained below.

The casing 35 is provided with a pair of annular chambers 8, 9, each of which is located between respective labyrinth seals 4, 5 and 6, 7 at each end of the casing 35.

The compressor 3 has a diffuser 12 which connects the compressor 3 to the turbine 2 and cooperates with a bulkhead 37 about the casing 35 to define a flow path for a gaseous working medium. In addition, the compressor 3 has an exit stator blading ring 10 associated with a terminal rotor blading ring 11 upstream of the diffuser 12. As shown, the bulkhead 37 is provided with a labyrinth seal 38 on the downstream end to seal the bulkhead relative to the rotor while the upstream end defines an annular opening with the rotor.

In order to further seal the interior of the casing 35 from the ambient zone and, particularly, from the flow path between the compressor 3 and turbine 2, a barrier medium is fed into the annular chambers 8, 9 of the casing 35 at a pressure $p_2$ greater than the pressure $p'_2$ in the casing 35. The barrier medium is thereafter dispensed through the seals 5, 7 out of the casing 35. The barrier medium consists of compressed air which is obtained from an air receiver 36 that is disposed in the flow path of the working medium between the exit of the compressor diffuser 12 and air supply duct (not shown) which extend to combustion chambers (not shown) as is known. The receiver 36 is separated by the bulkhead 37 and the labyrinth seal 38 from a chamber 39 which, in turn, surrounds the bearing casing 35. The barrier air is obtained at an elevated pressure $p_2$ from the air receiver 36 at the exit end of the diffuser 12 via a duct 18 and is supplied to the annular chambers 8 and 9 of the labyrinth seals via a cooler 19, which may be constructed as a cooling coil in a lubricating oil reservoir 26 of the pressurized oil system (not shown in the illustration for the sake of simplicity) and via ducts 20 or 21, respectively.

The gas turbine is also provided with a means which defines a return flow path so that the compressed air used as the barrier medium can be returned to the compressor 3. This means is formed by a space 40 in a recessed end of the casing 35, a space 41 between the compressor end of the casing 35 and the bulkhead 37 and a space 42 between the compressor end of the bulkhead 37 and a shouldered portion of the rotor. As shown, these spaces 40 – 42 are provided between the chamber 39 enclosed by the bulkhead 37 and the exit end of the labyrinth seal 5. The spaces 40 – 42 further communicate with the flow duct which merges into the diffusor 12 of the compressor 3 at a point upstream of the ring of exit stator blades 10 as viewed in the direction of working medium flow. The pressure $p_1$ prevailing at this point in the flow duct is less than the pressure $p_2$ at the tapping point of the duct 18 so that there is the relatively large pressure difference $\Delta p = p_2 - p_1$ available for the barrier air. This is particularly advantageous when a cooler 19 is used in the barrier air system. The pressure difference $\Delta p$ also prevents air flowing through the flow duct from passing through the labyrinth seals 5 and 7 against the bearing 1. Since the pressure $p'_2$ in the bearing casing 35 is maintained at a value which is smaller than the pressure $p_2$ in the duct 18, the barrier air will flow in the labyrinth seals 4, 6 into the bearing casing 35 to further ensure reliable sealing of the casing 35 relative to the surrounding ambient zone.

In order to lubricate the bearing 1, a pressurized oil system is provided. This system includes a return duct 22 connected to the casing 35 to draw lubricating oil from the casing 35 under a static gradient to a positive pressure reservoir 23. This reservoir 23 also connects at the top to the duct 13 which terminates in the bearing casing 35 in order to provide for pressure equilization with respect to the interior of the bearing casing 35. The lubrication system also includes a valve 24 in the reservoir 23 which is controlled by a float 43 in order to permit the lubricating oil to discharge via a duct 25 into the previously mentioned lubricating oil reservoir 26. The bearing 1 is supplied with cooled and bled lubricating oil through a pump 27 connected to the reservoir 26 via a cooler 28, duct 29 and a pressure regulator 34. The pressure of the oil is maintained at a value which is higher, for example, by two bar, than the pressure $p'_2$ in the casing 35. To this end, the regulator 34 is supplied with the pressure $p'_2$ in the duct 13 to the casing 35 as a reference pressure via a line 44, shown in broken lines, and operates in a known manner to ensure the higher pressure in the dut 29 to the bearing 1.

As shown, the connecting lines 14, 16 serve to communicate the upper portions of the reservoirs 23, 26 over the reducing valve 15. In addition, an electric valve 30 is disposed in a line 31 between the positive pressure reservoir 23 and the duct 25 to ensure adequate oil circulation under operating conditions in which the positive pressure in the reservoir 23 is low relative to the pressure in the reservoir 26, for example, for prelubrication or for starting up and running down of the plant. The valve 30 is controlled by a level regulator 32 in the positive pressure reservoir 23. In addition, the pressure in the reservoir 26 is defined by an exhaust fan 33 which is disposed in the line or duct 17 that extends to atmosphere. The pressure is therefore slightly below the ambient pressure.

What is claimed is:
1. A gas turbine comprising
 a compressor having a flow duct for a gaseous working medium, a terminal rotor blading ring in said flow duct and an adjacent exit stator blading ring in said flow duct;
 a turbine downstream of said compressor;
 a diffuser between said compressor and said turbine for conducting the working medium and air between said compressor and said turbine;
 a rotor bearing for said compressor and said turbine mounted between said compressor and said turbine;
 a casing housing said rotor bearing;
 contactless seals in said casing sealing said bearing from the ambient zone outside said housing;
 a tapping duct connected between an exit end of said diffuser and said seals to deliver a flow of barrier medium to said seals at a first pressure higher than in said ambient zone; and
 means defining a return flow path between said casing and said compressor flow duct to conduct the barrier medium from said seals into said flow duct at a pressure lower than said first pressure and at a point between said blading rings.

2. A gas turbine as set forth in claim 1 which further comprises a pressurized oil system for lubricating said bearing.

3. A gas turbine as set forth in claim 2 wherein said system includes an oil reservoir and which further includes a cooling coil in said oil reservoir for cooling the barrier medium in said tapping duct.

4. A gas turbine as set forth in claim 1 which further comprises a cooler in said tapping duct for cooling the barrier medium prior to entry into said seals.

* * * * *